United States Patent
Griffin et al.

(10) Patent No.: US 6,501,621 B1
(45) Date of Patent: Dec. 31, 2002

(54) AIR BEARING SLIDER HAVING IMPROVED TAKE-OFF VELOCITY

(75) Inventors: Peter T. Griffin, Shrewsbury, MA (US); Susumu Takagi, Brighton, MA (US); Tebor Heminway, Ashland, MA (US); Luciano Spiridigliozzi, Worcester, MA (US)

(73) Assignee: Matsushita Kotobuki Electronics Peripherals of America, Inc., Shrewsbury, MA (US)

( * ) Notice: Subject to any disclaimer, the term of this patent is extended or adjusted under 35 U.S.C. 154(b) by 248 days.

(21) Appl. No.: 09/718,939

(22) Filed: Nov. 22, 2000

(51) Int. Cl.$^7$ .................................................. G11B 5/60
(52) U.S. Cl. .................................................... 360/235.6
(58) Field of Search ............................. 360/235.5–237.1

(56) References Cited

U.S. PATENT DOCUMENTS

| | | |
|---|---|---|
| 5,267,104 A | 11/1993 | Albrecht et al. |
| 5,301,077 A | 4/1994 | Yamaguchi et al. |
| 5,309,303 A | 5/1994 | Hsia et al. |
| 5,353,180 A | 10/1994 | Murray |
| 5,388,017 A | 2/1995 | Franco et al. |
| 5,406,432 A | 4/1995 | Murray |
| 5,418,667 A | 5/1995 | Best et al. |
| 5,490,025 A | 2/1996 | Dorius et al. |
| 5,513,056 A | 4/1996 | Kawasaki et al. |
| 5,550,693 A | 8/1996 | Hendriks et al. |
| 5,568,981 A | 10/1996 | Nepela et al. |
| 5,721,650 A | 2/1998 | Crane et al. |
| 5,748,408 A | 5/1998 | Barrois et al. |
| 5,777,825 A | 7/1998 | Dorius |
| 5,796,550 A | 8/1998 | O'Sullivan et al. |
| 5,870,250 A | 2/1999 | Bolasna et al. |
| 5,872,685 A | 2/1999 | Park et al. |
| 5,872,686 A | 2/1999 | Dorius et al. |
| 5,886,856 A | 3/1999 | Tokuyama et al. |
| 5,917,679 A | 6/1999 | Park et al. |
| 5,926,344 A | 7/1999 | Kimura |
| 5,940,249 A | 8/1999 | Hendriks |
| 5,991,118 A | 11/1999 | Kasamatsu et al. |
| 6,021,024 A | 2/2000 | Akiyama et al. |
| 6,040,959 A | 3/2000 | Koabayashi et al. |
| 6,144,528 A | * 11/2000 | Anaya-Dufresne ....... 360/235.4 |

* cited by examiner

Primary Examiner—A. J. Heinz
(74) Attorney, Agent, or Firm—Amster, Rothstein & Ebenstein (57) ABSTRACT

An air bearing slider supports a transducer over a moving recording medium based on air flow generated by the movement of the recording medium. A first pad is formed near a leading edge of the slider and has a first leading edge contoured to provide a first effective length relative to the air flow for the first pad. A second pad is formed near a trailing edge of the slider and has a second leading edge contoured to provide a second effective length relative to the air flow for the second pad. A third pad is formed near the trailing edge of the slider and has a third leading edge which is contoured to provide a third effective length relative to the air flow for the third pad. The first, second, and third effective lengths vary as the air bearing slider moves relative to the moving recording medium to maintain a desired orientation and fly height for the slider during such movement.

18 Claims, 11 Drawing Sheets

PRIOR ART

FIGURE 12

AIR BEARING SLIDER HAVING IMPROVED TAKE-OFF VELOCITY

BACKGROUND OF THE INVENTION

1. Field of the Invention

This invention relates generally to air bearing sliders that support transducers over moving recording media and, more particularly, to an air bearing slider which exhibits an improved takeoff velocity.

2. Background Description

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

During operation of the magnetic disk drive, the slider is suspended (i.e., "flies") above the magnetic media disk. The separation between the slider and the magnetic media disk is referred to as the "fly height." The goal of air bearing slider design is to achieve a minimal fly height without having the slider physically impact the magnetic media disk. Smaller fly heights are desired so that the transducer can distinguish between the magnetic fields emanating from the closely spaced tracks of the magnetic disk media, thereby making possible an increased recording density for the magnetic disk drive.

In so-called "contact start-stop" ("CSS") magnetic disk drive designs, it is common for a region on the surface of the magnetic media disk to be textured. This textured region, which is found at the inner diameter of the disk and is referred to in this specification as the "landing zone", is the region from which the slider lifts off when the magnetic media disk begins moving and is the region to which the slider returns when the magnetic media disk ceases moving.

When used with disks that include a landing zone, a slider must achieve lift quickly once the disk has begun moving to clear the height of the texturing provided on the surface of the disk in the landing zone. The longer the slider takes to lift off the surface of the landing zone (i.e., the slower the slider's take-off velocity), the longer the time (or the number of rotations) that the slider is in contact with the magnetic media disk. The result is increased wear at the interface of the slider and the magnetic media disk. Furthermore, a slider that has a slow take-off velocity also has the added drawback that any collisions between it and the magnetic media disk that occur at the late stages of the take-off process occur at a high velocity. Such high velocity collisions also increase the wear at the interface of the slider and the magnetic media disk.

The prior art has addressed the problem of achieving a desired take-off, or clearance between the slider and the magnetic media disk. For example, U.S. Pat. No. 5,418,667 to Best et al. entitled SLIDER WITH TRANSVERSE RIDGE SECTIONS SUPPORTING AIR-BEARING PADS AND DISK DRIVE INCORPORATING THE SLIDER ("the Best '667 Patent") discloses an air bearing slider pad which rests on a step surface and which is angled to provide extra air bearing lift to the slider at the inner diameter of the magnetic media disk. U.S. Pat. No. 5,870,250 to Bolasna et al. entitled METHOD AND APPARATUS FOR IMPROVING FILE CAPACITY USING DIFFERENT FLYING HEIGHT PROFILES discloses different embodiments of air bearing sliders which use angled rails to create desired air pressure distributions at predetermined radii of a recording medium. Similarly, U.S. Pat. No. 5,796,550 to O'Sullivan et al. entitled METHOD AND APPARATUS FOR PROVIDING DIVERGING RAIL EDGE GEOMETRY FOR AIR BEARING SLIDER discloses a slider having air bearing pads or rails that have at least one edge diverging from the side edges of the pad's or rail's support structure to reduce the slider's sensitivity to skew and roll.

The prior art has also addressed the problem of the altitude sensitivity of the fly height air bearing sliders. U.S. Pat. No. 5,777,825 to Dorius entitled NEGATIVE PRESSURE STEP PAD AIR BEARING DESIGN AND METHOD FOR MAKING THE SAME ("the Dorius '825 Patent") discloses several embodiments of an air bearing slider which use front and back air bearing surface pads that rest on leading and trailing step surfaces. According to the Dorius '825 Patent, prior art air bearing slider designs exhibit sensitivity to changes in altitude. This sensitivity poses a reliability problem for magnetic disk drives in that a decrease in a slider's fly height caused by an increase in altitude results in more interactions between the slider and the magnetic media disk of the magnetic disk drive. Consequently, the incidence of magnetic disk drive failures increases with increases in altitude. The Dorius '825 Patent is directed to providing an air bearing slider which possesses a reduced sensitivity to changes in altitude. The air bearing slider design described in the Dorius '825 Patent takes a step-pad (i.e., bobsled) design and adds a negative pressure (i.e., subambient pressure) pocket between the leading-edge and trailing edge pads of the slider. The slider is described as requiring only two etch depths to manufacture, and the negative pressure pocket is described as being etched to a specific depth to achieve the desired reduction in altitude sensitivity.

The prior art has not, however, addressed the problem of improving the take-off velocity of an air bearing slider. The Best '667 Patent, for example, is directed to achieving a clearance between the slider and the magnetic media disk, but it does not address the problem of achieving a faster take-off velocity for the slider. The Dorius '825 Patent, by way of another example, is strictly directed to improving the altitude sensitivity of sliders, and does not recognize the need to improve the take-off velocity of air bearing sliders. Nor does the Dorius '825 Patent recognize the need to balance the altitude sensitivity of a slider with its take-off velocity. Accordingly, there is a need in the art for an air bearing slider that has an improved take-off velocity.

SUMMARY

The present invention is directed to an apparatus that satisfies the need for an air bearing slider that has an improved take-off velocity. According to the embodiments of the present invention, the time (or the number of rotations) during which the slider is in contact with the magnetic media disk is reduced.

According to an embodiment of the present invention, an air bearing slider for supporting a transducer over a moving recording medium comprises: a first pad formed near a leading edge of the slider and defining a negative pressure region of the slider; a second pad formed at a trailing edge of the slider and having an air bearing surface with a leading edge which is contoured such that air flow incident upon the second pad creates a predetermined positive pressure underneath the second pad at a first skew angle of the slider; and a third pad formed at the trailing edge of the slider and having an air bearing surface with a leading edge which is contoured such that air flow incident upon the third pad creates a predetermined positive pressure underneath the third pad at a second skew angle of the slider.

The air bearing slider may further comprise a first ramp surface contiguous with a leading edge of the air bearing surface of the first pad. The first pad may further comprise first and second legs connected by a bridge section to form a generally horseshoe shape.

The air bearing slider may further comprise a second ramp surface contiguous with a leading edge of the air bearing surface of the second pad.

The air bearing slider may further comprise a third ramp surface contiguous with a leading edge of the air bearing surface of the third pad.

The first skew angle may comprise a skew angle of the slider at an inner diameter of the recording medium. An air flow vector representing the air flow incident on the second pad at the first skew angle may be orthogonal to the leading edge of the air bearing surface of the second pad.

The second skew angle may comprise a skew angle of the slider at an outer diameter of the recording medium. An air flow vector representing the air flow incident on the third pad at the second skew angle may be orthogonal to the leading edge of the air bearing surface of the third pad.

The first, second, and third ramp surfaces may comprise step-type ramp surfaces. The step-type ramp surfaces may be formed at a first etch depth.

The negative pressure region may be formed at a second etch depth that is greater than the first etch depth.

The first and second pads and the first and third pads may define air bleed slots.

The above, and other features, aspects, and advantages of the present invention will become apparent from the following description read in conjunction with the accompanying drawings, in which like reference numerals designate the same elements.

DETAILED DESCRIPTION

Figure 12:
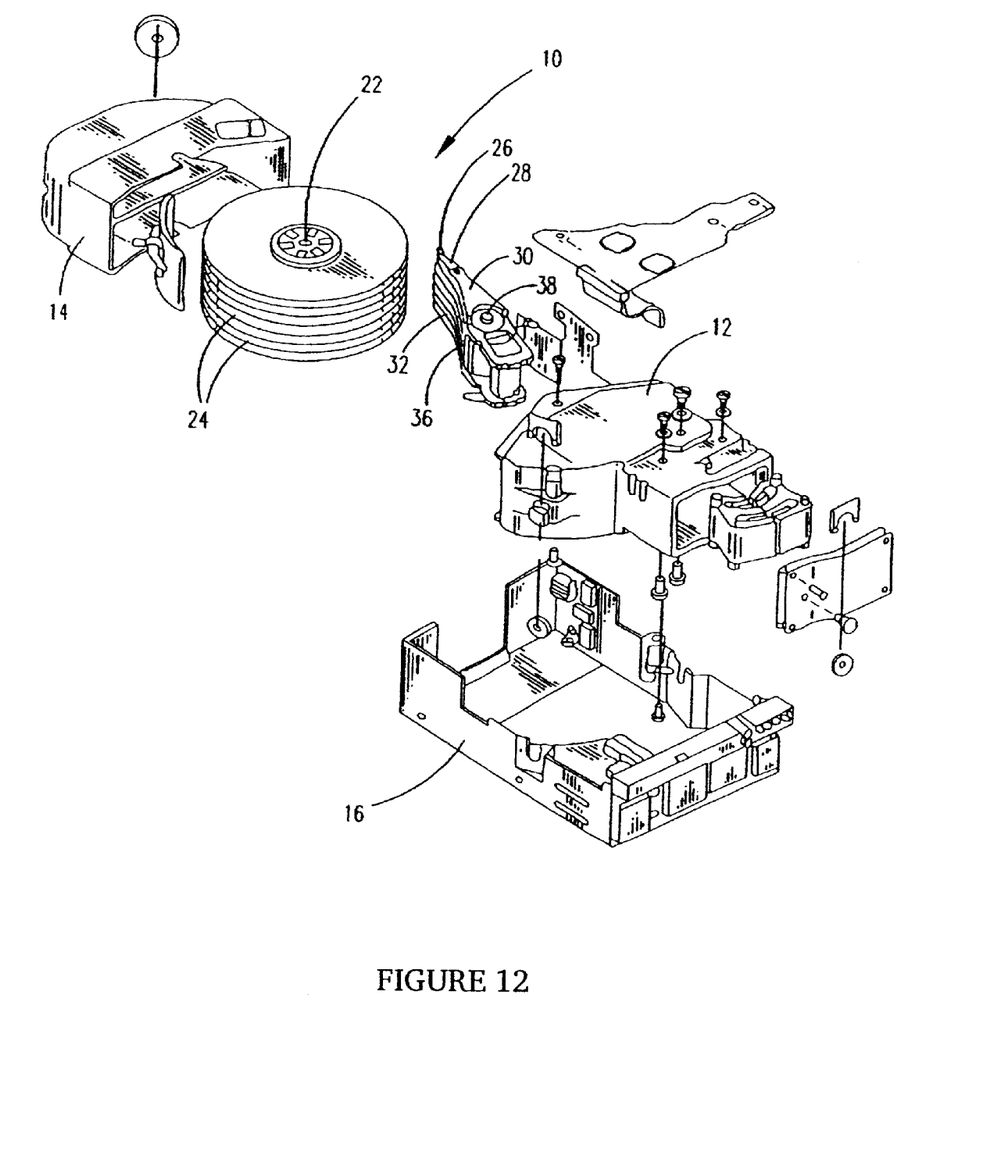
FIG. 12 is an exploded view of an exemplary disk drive that can be used with the present invention.

An exploded view of an exemplary disk drive that can be used with the present invention is shown in FIG. 1 of U.S. Pat. No. 5,796,550 to O'Sullivan et al. and is reproduced herein as FIG. 12. Referring to FIG. 12, disk drive 10 includes a housing 12 and a housing cover 14 which, after assembly, is mounted within a frame 16. Mounted within the housing is a spindle shaft 22. Rotatably attached to the spindle shaft 22 are a number of disks 24. Eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, the inventive sliders described further herein are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. It should be appreciated by those having ordinary skill in the art that the embodiments of sliders according to the present invention are not meant to be limited to the disk drive 10 described above.

Figure 1:
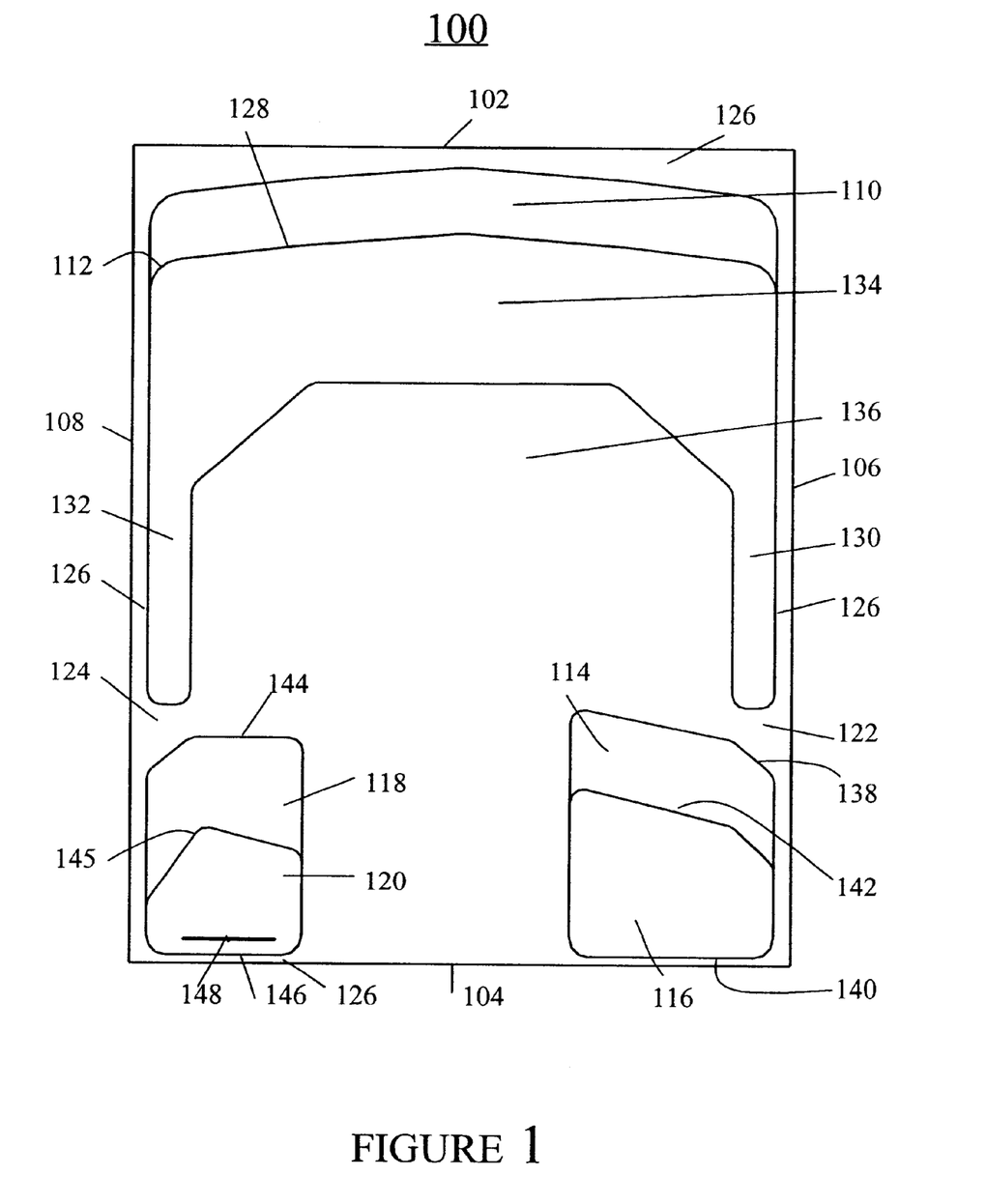
FIG. 1 shows a bottom plan view of an embodiment of an air bearing slider according to the present invention when operationally oriented with respect to the disk surface.

FIG. 1 shows an embodiment of an air bearing slider, generally designated 100, according to the present invention. The slider 100 includes a leading edge 102, a trailing edge 104, an inner edge 106, and an outer edge 108. The air flow created by the movement of the disk (not shown) is incident upon the slider 100 at its leading edge 102. The inner edge 106 of the slider 100 is defined by its proximity to the inside diameter of the disk when the slider 100 is suspended over the disk. Conversely, the outer edge 108 is defined by its proximity to the outer diameter of the disk when the slider 100 is suspended over the disk. The currently preferred embodiment of the slider 100 is manufactured from an alumina titanium carbide (AlTiC) material. It will be appreciated by those having skill in the art that the slider 100 may be manufactured from other suitable materials.

The slider 100 further includes a leading edge ramp 110, a leading edge pad 112, an inner trailing edge ramp 114, an inner trailing edge pad 116, an outer trailing edge ramp 118, and an outer trailing edge pad 120. Pads 112, 116, and 120 each form an air bearing surface ("ABS"). In the preferred embodiment, ramps 110, 116 and 118 form steps with respect to their respective pads, but other shapes for the ramps 110, 114 and 118 are also envisioned, including linear tapers or more complicated contours. The leading edge pad 112 and the inner trailing edge ramp 114 are positioned to provide an inner air "bleed slot" 122 therebetween. Likewise, the leading edge pad 112 and the outer trailing edge ramp 118 are positioned to provide an outer air "bleed slot" 124 therebetween. The slider 100 also includes an outer border region 126 around its perimeter. The magnetic transducer 148 is formed on the outer trailing edge pad 120 by techniques that are well known in the art.

The leading edge ramp 110 is formed by etching the slider 100 to a first depth. According to the embodiments of the present invention, the first etch depth is preferably greater than or equal to approximately 50 nanometers and less than or equal to approximately 300 nanometers. In a presently preferred embodiment, the slider 100 is etched to a shallow first depth of approximately 140 nanometers to form the leading edge ramp 110. The slider 100 can be etched to the first depth using any suitable technique that is known to those having skill in the art, including but not limited to ion milling, ion bombardment with a chemical assist (using boron trichloride or a less reactive gas), or inductively coupled plasma etching using a reactive gas. In the presently preferred embodiments according to the present invention, the slider 100 is formed by inductively coupled plasma etching using Halocarbon-14 (CF 4). The leading edge ramp 110 is contiguous with the leading edge pad 112 along the contour 128 of the pad 112. As is well known in the art, the leading edge ramp 110 compresses the air flow incident to the slider 100 at its leading edge 102 to provide positive pressure under the leading edge pad 112 to lift the slider 100 off of the disk.

According to an embodiment of the present invention, the leading edge pad 112 has a generally horseshoe (or "wrap-around") shape and includes an inner leg 130, an outer leg 132, and a bridge portion 134 connecting the inner leg 130 to the outer leg 132. Again, the legs 130 and 132 are defined as "inner" or "outer" legs based on their proximity to either the inside diameter of the disk or the outer diameter of the disk when the slider 100 is suspended over the disk, as described above with respect to the edges 106 and 108 of the slider 100.

As shown in FIG. 1, the leading edge pad 112 may be asymmetrical in two senses. First, the leading edge pad 112 may be asymmetrical about its longitudinal axis because the shapes and lengths of the legs 130 and 132 need not be identical. Second, the bridge portion 134 may be asymmetrical about the longitudinal axis of the slider 100 because the bridge portion 134, as shown in FIG. 1, is shifted toward the outer edge 108 of the slider 100. The shape of the legs 130 and 132 and the position of the bridge portion 134 relative to the longitudinal axis of the slider 100 are chosen to optimize the performance of the slider 100 for a particular disk drive, and are thus left to the judgment of one having skill in the art. Therefore, the leading edge pad 112 may be symmetrical, or may exhibit varying degrees of asymmetry, depending upon the requirements of the particular disk drive in which the slider 100 is used.

The bridge portion 134 and the legs 130 and 132 define a cavity 136 which, as is well known in the art, functions as a negative pressure area (i.e., has a sub-ambient pressure). According to the embodiments of the present invention, the second etch depth is greater than the first etch depth. More specifically, the second etch depth is preferably greater than or equal to approximately 500 nanometers and less than or equal to approximately 3000 nanometers. In a presently preferred embodiment, the cavity 136 is etched to a second depth of approximately 1800 nanometers using any suitable etching technique known to those skilled in the art, including but not limited to those techniques previously identified herein.

In the embodiment of FIG. 1, slider 100 is provided with two trailing edge pads having respective ramps. The inner trailing edge ramp 114 is formed by etching the slider 100 to a predetermined depth using a technique known to those skilled in the art, as previously described herein. The inner trailing edge pad 116 includes ramp 118. In the preferred embodiment, ramps 110, 114 and 118 are all etched to the same depth (e.g., the first depth of the leading edge ramp 110) during a single etching operation.

The prior art has recognized that the etch depths of the cavity 136 and the ramps 110, 114, and 118 affect the altitude sensitivity of an air bearing slider. The Dorius '825 Patent, for example, is directed to an air bearing slider which possesses a reduced altitude sensitivity. That slider includes a deep etched negative pressure pocket and several shallow etched step regions which are all etched to the same depth. The Dorius '825 Patent teaches that the depth of the negative pressure pocket can be optimized to minimize the altitude sensitivity of the slider, and that the depth of the shallow step regions can then be optimized to achieve a desired fly height profile.

The Altitude Ratio of the slider, defined as the fly height of the slider at an altitude of 10,000 feet above sea level to the fly height of the slider at sea level, is but one aspect of the slider's performance. Those having ordinary skill in the art realize that, in designing a particular air bearing slider, the altitude sensitivity must be considered in conjunction with other aspects of the slider's performance, for example its take-off velocity. The goal in designing the slider thus becomes achieving an appropriate balance between the slider's altitude sensitivity and its take-off velocity. The Dorius '825 Patent, in focusing solely on the altitude sensitivity of the slider, provides no insight into the effect of the etch depths of the slider on its take-off velocity.

Figure 2:
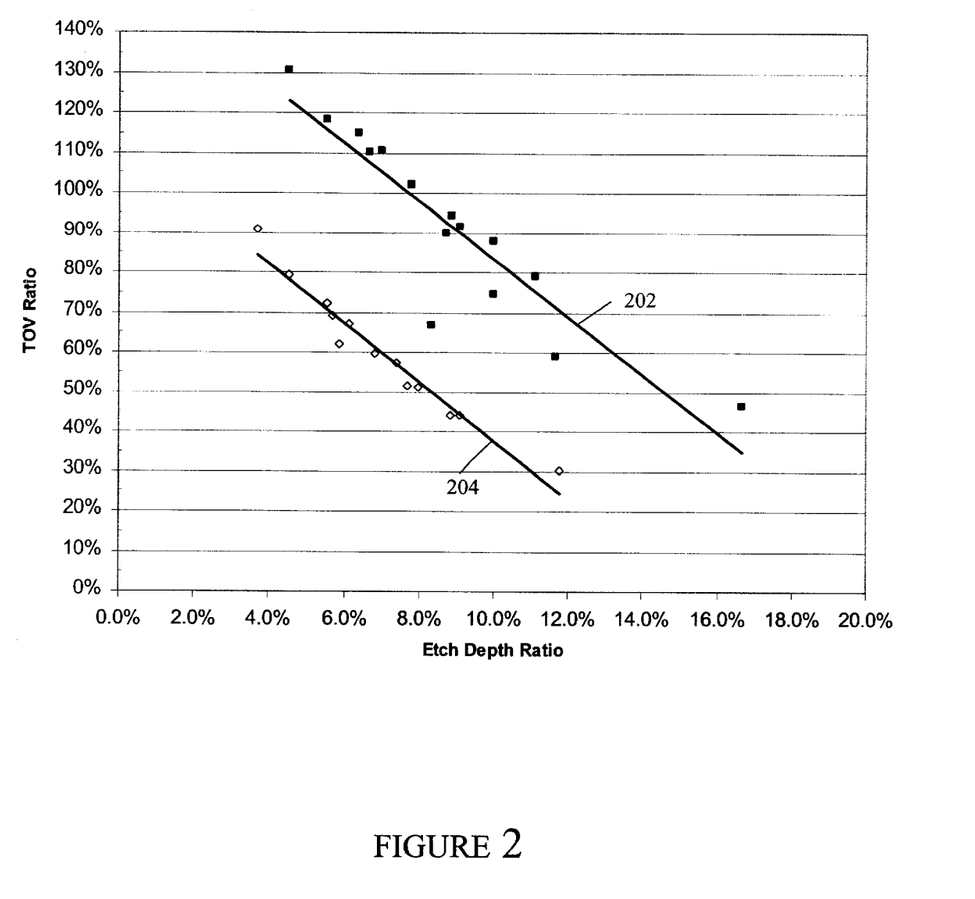
FIG. 2 illustrates the relationship between the Take-Off Velocity Ratio and the Etch Depth Ratio for embodiments of air bearing sliders according to the present invention.

According to an embodiment of the present invention, the inventors have made the significant discovery that the ratio of the shallow etch depth of the ramps 110, 114, and 118 to the deep etch depth of the cavity 136 can be varied advantageously to affect the take-off velocity of the slider 100. The take-off point of the slider 100 is the point at which the body of the slider 100 is no longer in contact with (i.e., flies above) the surface of the disk. FIG. 2 illustrates the take-off velocity ratio ("TOV Ratio") of a slider as a function of its Etch Depth Ratio. The TOV Ratio is defined as the ratio of the fly height of the slider in the landing zone at one-half of the target operating rotational velocity of the disk to the fly height of the slider in the landing zone at the target operating rotational velocity of the disk. The Etch Depth Ratio is defined as the ratio of the shallow etch depth of the ramps 110, 114, and 118 to the deep etch depth of the cavity 136.

FIG. 2 generally shows that, to achieve an improved take-off velocity i.e., a large TOV Ratio, air bearing sliders according to the preferred embodiments of the present invention should have a small Etch Depth Ratio, i.e., a shallow first etch depth in relation to the deeper etch depth of the cavity. Specifically, the upper line 202 of FIG. 2, which represents the TOV Ratio for the slider 100, shows that the slider 100 achieves TOV Ratios in the range of approximately 30% and above 120%. FIG. 2 further shows that the TOV Ratio is greatest for values of the Etch Depth Ratio that are less than 5.0%. In a presently preferred embodiment, the Etch Depth Ratio of the slider 100 is approximately 7.77% (140 nanometers/1800 nanometers). The large TOV Ratio indicates that sliders fabricated according to the embodiments of the present invention attain a larger fly height in the landing zone at a lower rotational velocity of the media or disk and hence exhibit an improved take-off velocity.

Figure 11:
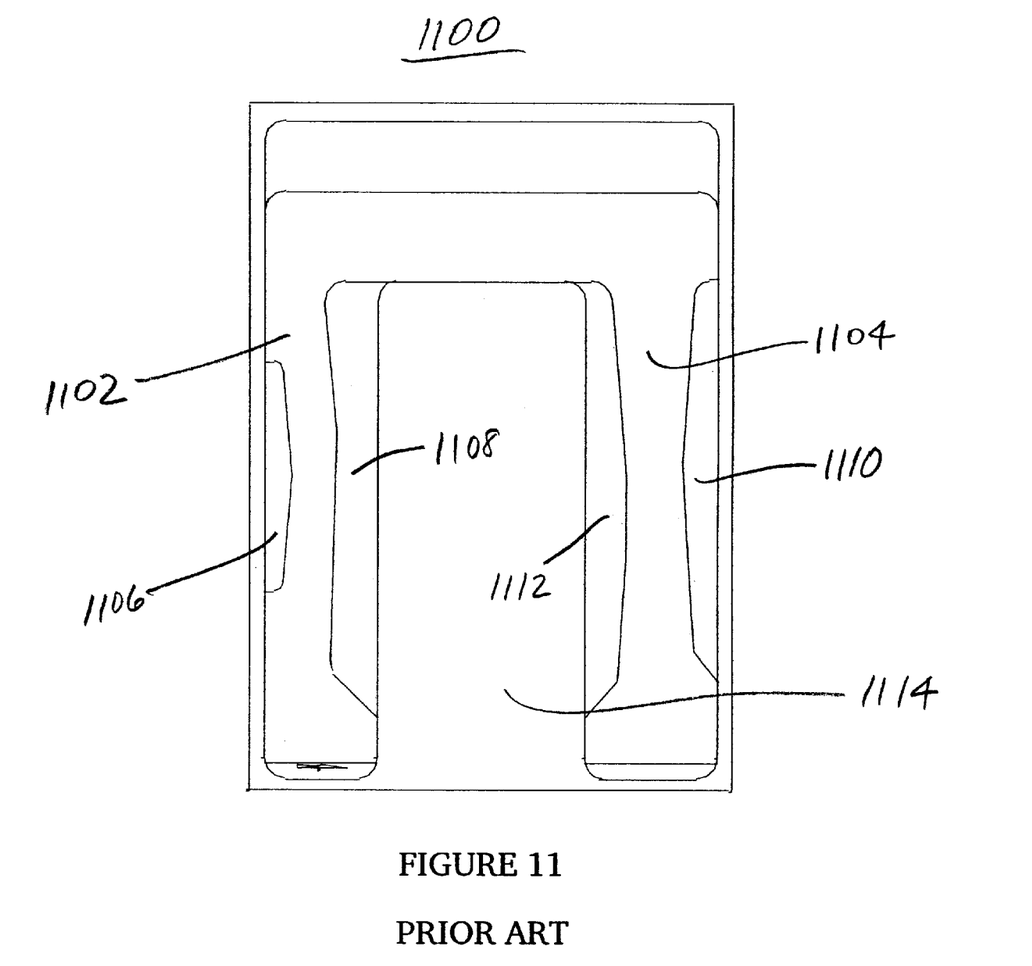
FIG. 11 shows a bottom plan view of an embodiment of a prior art rail-type air bearing slider.

According to a further aspect of the present invention, the inventors have determined that the TOV Ratio is greatest for smaller values of the Etch Depth Ratio not only for the pad-type sliders specifically described herein, but also for other sliders that are formed with first and second etch depths, including the well known class of rail-type sliders, some of which may be fabricated using double etch techniques. FIG. 11 shows a bottom plan view of a prior art rail-type air bearing slider. The slider 1100 includes rails 1102 and 1104. Rail 1102 has regions 1106 and 1108 that are etched to a first depth along its side edges. Similarly, rail 1104 has regions 1110 and 1112 that are etched to the first depth along its side edges. The slider 1100 further includes a subambient pressure region 1114 that is etched to a second depth that is deeper than the first depth. Although rail-type sliders of the type shown in FIG. 11 are prevalent in the prior art, there is no teaching in the prior art regarding optimizing the Etch Depth Ratios of such prior art rail-type sliders to improve their take-off velocities. In accordance with the present invention, the Etch Depth Ratio of the first etch depth of the regions 1106 and 1108 to the second etch depth of the subambient pressure region 1114 can be optimized to improve the TOV Ratio of the slider 1100.

The lower line 204 of FIG. 2 represents the TOV Ratio for the rail-type slider 1100 shown in FIG. 11. As shown in FIG. 2, the TOV Ratio is greatest for values of the Etch Depth Ratio that are less than 5.0%, and achieves a TOV Ratio in excess of 80%. The lower line 204 of FIG. 2 thus indicates that even rail-type sliders with two etch depths that have small Etch Depth Ratios attain larger fly heights at lower rotational velocities and hence exhibit improved take-off velocities, i.e., have large TOV Ratios.

Figure 3:
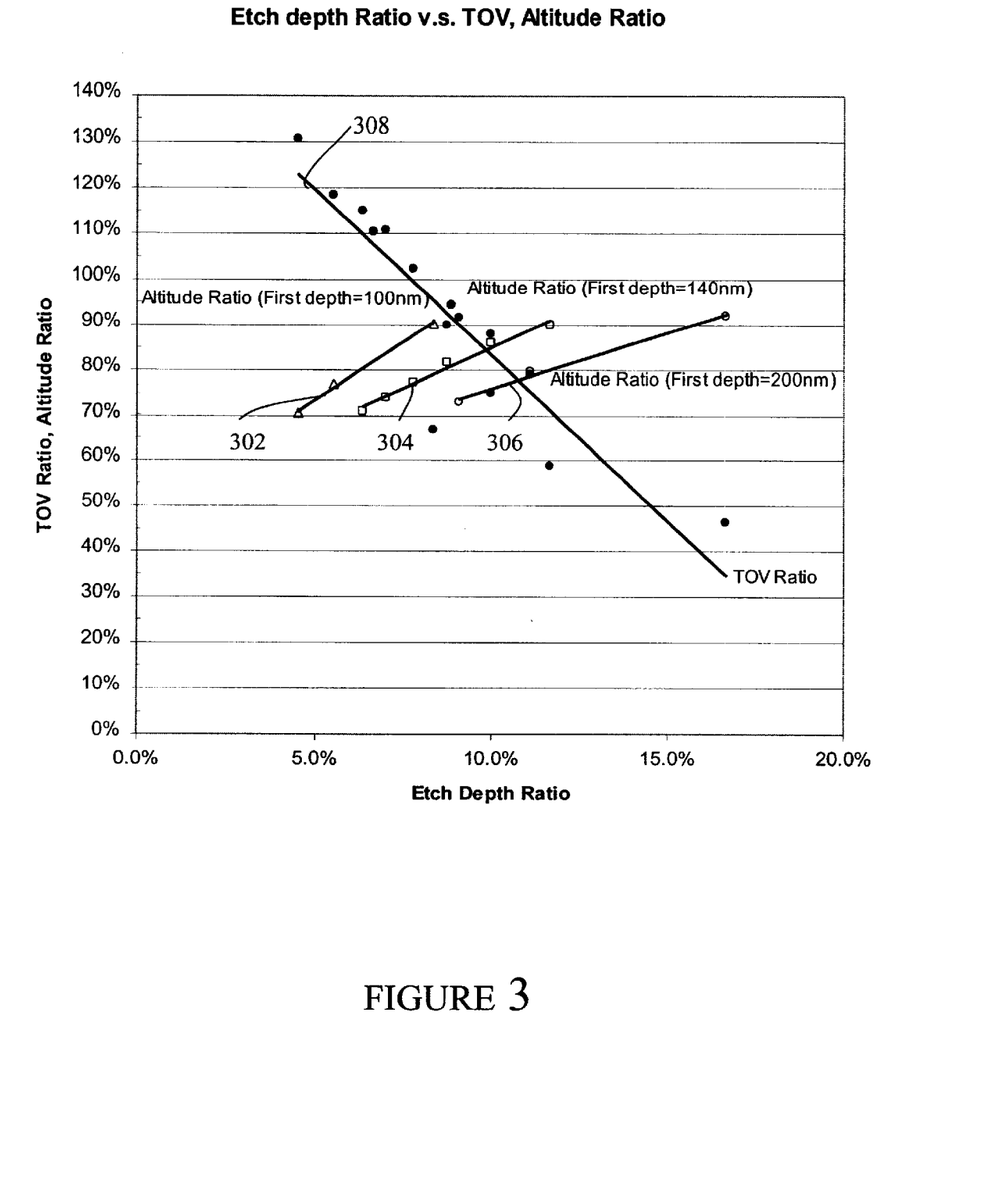
FIG. 3 illustrates the relationship between the Etch Depth Ratio, the Take-Off Velocity Ratio, and the Altitude Ratio for the air bearing slider shown in FIG. 1.

At the same time, while a particular Etch Depth Ratio may be advantageous with respect to achieving a desired take-off velocity, that same Etch Depth Ratio may not be desirable with respect to another aspect of the slider's performance. FIG. 3 shows the relationship between Altitude Ratio, TOV Ratio, and Etch Depth Ratio for three embodiments of an air bearing slider according to the present invention. The three embodiments differ in the magnitude of the first etch depth for the ramps 110, 114, and 118. Trend line 302 corresponds to an embodiment that has a first etch depth of approximately 100 nanometers; trend line 304 corresponds to another embodiment that has a first etch depth of approximately 140 nanometers; and trend line 306 corresponds to a third embodiment that has a first etch depth of approximately 200 nanometers. For each of the three embodiments, the Altitude Ratio was determined for deep etch depths of the cavity 136 of approximately 2200 nanometers, 1800 nanometers, and 1200 nanometers. For each of the trend lines 302, 304, and 306, the lowest values of Altitude Ratio and Etch Depth Ratio are provided at a deep etch depth of 2200 nanometers, and the highest values of Altitude Ratio and Etch Depth Ratio are provided at a deep etch depth of 1200 nanometers. As will be appreciated from an examination of trend lines 302, 304, and 306, the highest values of the Altitude Ratio for each of the three embodiments are approximately equal to one another, even though the first depths that correspond to the trend lines 302, 304, and 306 are different. Thus, the Altitude Ratio for each of the embodiments is determined by the magnitude of the deep etch depth of the cavity 136.

The relationship between TOV Ratio and Etch Depth Ratio is represented in FIG. 3 by trend line 308. This relationship is affected by the magnitude of the first depth of the ramps 110, 114, and 118, although there is only the one trend line 308 corresponding to the three depths of the ramps 110, 114, and 118 examined in FIG. 3. However, the effect of different first etch depths on TOV Ratio is not pronounced, so the relationship between TOV Ratio and Etch Depth Ratio in this example appears to remain effectively the same regardless of the magnitude of the first etch depth.

The Altitude Ratio trend lines 302, 304, and 306 shown in FIG. 3 slope upwardly as Etch Depth Ratio increases, thereby indicating that an improved Altitude Ratio is achieved with larger values of the Etch Depth Ratio. Conversely, the TOV Ratio trend line 308 shown in FIG. 3 slopes downwardly as Etch Depth Ratio increases, thereby indicating that an improved TOV Ratio is achieved with smaller values of the Etch Depth Ratio. Those having skill in the art will thus appreciate that the designer of a slider must strike a desired balance between, for example, the slider's take-off velocity (as represented by its TOV Ratio) and its altitude sensitivity (as represented by its Altitude Ratio). In other words, to achieve an optimal combination for TOV Ratio and Altitude Ratio for a particular slider design, the designer of the slider must specify a relatively shallow deep etch depth for the cavity 136 and a very shallow first etch depth of the ramps 110, 14, and 118. For example, referring to FIG. 3, one having ordinary skill in the art will understand that only the first and second embodiments associated respectively with trend lines 302 and 304 can provide a TOV Ratio of 80% in conjunction with an Altitude Ratio of 80%.

It will be further appreciated by those having ordinary skill in the art that the Altitude Ratio trend lines 302, 304, and 306 and the TOV Ratio trend line 308 shown in FIG. 3 can be used to define a "design space" within which the designer of an air bearing slider can strike the desired balance between competing performance characteristics of the slider. A designer can, for instance, choose a particular balance between the take-off velocity and the altitude sensitivity of the slider by selecting particular percentage values of the TOV Ratio and the Altitude Ratio, and then determining the range of values for the Etch Depth Ratio that will effect the desired balance. For example, referring to FIG. 3, if the designer desires to strike the balance between the take-off velocity and the altitude sensitivity of the slider by defining a design space that is characterized by a TOV Ratio equal to 60% and an Altitude Ratio that is equal to 80%, the slider will exhibit the desired balance in performance between take-off velocity and altitude sensitivity for Etch Depth Ratios in the range of approximately 6% and approximately 13% (for a shallow etch depth of 100 nanometers), of approximately 9% and approximately 13% (for a shallow etch depth of 140 nanometers), and of approximately 12% and approximately 13% (for a shallow etch depth of 200 nanometers).

Once a desired ratio of the etch depths of the ramps 110, 114, and 118 to the etch depth of the cavity 136 has been chosen, one skilled in the art can choose the shape, dimension, and placement of the leading edge pad 112 and the trailing edge pads 116 and 120 to optimize the fly height profile and take-off velocity of the slider 100. For example, the shapes of the portion 138 of the leading edge of the ramp 114 and the leading edge 142 of the inner trailing edge pad 116 are chosen to optimize (e.g., increase) the effective lengths of the ramp 114 and the pad 116 for air flowing across the ramp 114 and the pad 116 at the inner diameter of the disk to compensate for the lower linear velocities and negative skew angles associated with the inner diameter of the disk. As used herein, the term "effective length" is defined as the length dimension (of a ramp or a pad), in the direction of air flow, over which air flows at the skew angle of the slider. The exemplary embodiment of slider 100 shown in FIG. 1 provides an optimized effective length of the ramp 114 at the inner diameter of the disk by shaping the leading edge 142 of the inner trailing edge pad 116 such that the edge 142 is orthogonal to the direction of air flow incident on the ramp 114 and the pad 116 when the slider is oriented in the landing zone. This optimized length of the ramp 114 at the landing zone will then provide increased pressure for the pad 116, as shown in FIG. 1, if the pad 116 is of a sufficient size.

As shown in FIG. 1, the portion 138 of the leading edge of the ramp 114 is angled with respect to the trailing edge 140 of the pad 116 (i.e., the portion 138 and the trailing edge 140 are not parallel) such that an air flow vector representing the air flow incident on the portion 138 of the leading edge of the step ramp 114 is generally orthogonal to the portion 138 when the slider 100 is at a maximum negative skew angle over the landing zone of the disk. Consequently, the effective length of the ramp 114 at the landing zone of the disk, defined as the length of the ramp 114 over which air flows and is thereby compressed, is maximized. Concomitantly, the leading edge 142 of the inner trailing edge pad 116 is shaped such that the compressed air from the ramp 114 flows over a maximum effective length of the pad 116. The result is high positive pressure under the pad 116 when the slider 100 is at its maximum negative skew angle over the landing zone of the disk.

Similarly, the shapes of the portion 144 of the leading edge of the ramp 118 and the leading edge 145 of the outer trailing edge pad 120 are chosen to optimize (e.g., decrease) the effective lengths of the ramp 118 and the pad 120 for air flowing across the ramp 118 and the pad 120 at the outer diameter of the disk to compensate for the higher linear velocities and positive skew angles associated with the outer diameter of the disk. For example, the embodiment of slider 100 shown in FIG. 1 provides an optimized effective length of the ramp 118 at the outer diameter of the disk by shaping the leading edge 145 of the inner trailing edge pad 120 such that the edge 145 is not orthogonal to the direction of air flow incident on the ramp 118 and the pad 120 when the slider is oriented at the outer diameter of the disk. This optimized length of the ramp 118 at the outer diameter of the disk will then provide decreased pressure for the pad 120.

As shown in FIG. 1, the outer trailing edge ramp 118 is formed by etching the slider 100 to a predetermined depth using a technique known to those skilled in the art, as previously described herein. The step ramp 118 converges air flow to provide positive pressure for the inner trailing edge pad 120. The leading edge 144 of the step ramp 118 is generally parallel to the trailing edge 146 of the pad 120. The shape of the pad 120 is designed to optimize the effective length of the pad 120 when the slider is at the outer diameter of the disk. In this way, the positive pressure under the pad 120 is tuned to achieve and maintain target fly height when the slider 100 is at the outer diameter of the disk.

Those having skill in the art will appreciate that, since the skew angle of the slider 100 changes as the slider 100 moves from the inner diameter of the disk to the outer diameter of the disk, the shapes of the portions 138 and 144 and the edges 142 and 145 must also be chosen to meet the fly height requirements at all skew angles and disk linear velocities between the inner and outer diameters of the disk, and not only at the inner and outer diameters of the disk. According to the embodiments of the present invention, the shapes of the portions 138 and 144 and the edges 142 and 145 are designed to provide optimized effective lengths for the ramps 114 and 118 and the respective pads 116 and 120 across the entire sweep of skew angles of the slider 100, from the inner diameter to the outer diameter of the disk, to balance the effects of variations in the linear velocity of the disk and the effective lengths of the ramps 114 and 118 and the pads 116 and 120 to maintain constant fly height for the slider 100. For example, in a disk drive where the inner to outer skew angles are symmetrical, the maximum pressure for the inner pad 116 shown in FIG. 1 will be at the landing zone and will gradually decrease as the slider 100 is actuated toward the outer diameter of the disk. An examination of the shape of the edge 142 shows that the effective length of the ramp 114 is gradually reduced as one traces the air flow direction across the ramp 114 and the pad 116 at the various skew angles as the slider 100 is actuated from the inner diameter to the outer diameter of the disk.

Similarly, the minimum effective ramp length for the ramp 118 shown in FIG. 1 will be at the outer diameter and will gradually increase as the slider 100 is actuated toward the inner diameter of the disk. Accordingly, the effect of higher linear velocities is balanced by the reduced effective ramp and pad lengths at the outer diameter of the disk to maintain constant fly height of the slider 100. An examination of the shape of the edge 145 shows that the effective length of the ramp 118 is gradually increased as one traces the air flow direction across the ramp 118 and the pad 120 at the various skew angles as the slider 100 is actuated from the outer diameter to the inner diameter of the disk.

According to a further embodiment of the present invention, the air bleed slots 122 and 124 enable a larger positive pressure to develop underneath the trailing edge pads 116 and 120 than would be the case if the air bleed slots 122 and 124 were not present. One factor that is believed to contribute to causing the large positive pressure to build up underneath the trailing edge pads 116 and 120 is increased air flow across the trailing edge ramps 114 and 118 that is made possible by the presence of the air bleed slots 122 and 124. The pressure differential between the positive-pressure outer border region 126 and the negative pressure cavity 136 is believed to be directing air flowing along the outer border region 136 at the sides 106 and 108 of the slider 100 toward the trailing edge ramps 114 and 118. The increased air flow is then converged by the ramps 114 and 118 to provide increased positive pressure underneath their respective pads 116 and 120.

Another factor that is believed to contribute to the increased pressures underneath the trailing edge pads is that the air bleed slots 122 and 124 vent the negative pressure cavity 136 to higher, positive pressures at the leading edge 138 of the ramp 114 and at the leading edge 144 of the ramp 118. That is, the negative pressure of the cavity 136 is vented to near ambient pressure directly in front of the ramps 114 and 118. The magnitude of the positive pressures at the leading edges 138 and 144 of the ramps 114 and 118 depends on the extent of the separation between the legs 130 and 132 of the leading edge pad 112 and the leading edges 138 and 144 of the trailing edge ramps 114 and 118. As a result, the air flow that is compressed by the respective step ramps 114 and 118 to provide further positive pressure under each of the respective trailing edge pads 116 and 120 starts out at a higher pressure than if the air bleed slots 122 and 124 were not present. Consequently, the trailing edge 104 of the slider 100 separates from the magnetic media disk more quickly than is possible with prior art slider designs, thereby causing the slider 100 to be substantially flat as it lifts off from the landing zone of the magnetic media disk and reducing the pitch of the slider 100 as it flies over the magnetic media disk. Significantly, the advantages provided by the air bleed slots 122 and 124 are achieved without sacrificing the benefits that are provided by the negative pressure cavity 136.

According to a further embodiment of the present invention, the air bleed slots 122 and 124 also enable the creation of a discrete pressure profile for each of the pads 112, 116, and 120 as the slider 100 sweeps from the inner diameter to the outer diameter of the magnetic media disk. In prior art rail-type air bearing slider designs, the pressure profile at the trailing edge of the slider is coupled to the pressure profile at the leading edge of the slider because the rails of the slider extend from the leading edge to the trailing edge of the slider. In sliders according to the preferred embodiments of the present invention, the presence of the air bleed slots 122 and 124 enables a slider designer to tailor desired pressure profiles for the pads 112, 116, and 120 that are not coupled to one another as the slider sweeps from the inner diameter to the outer diameter of the magnetic media disk. One advantage provided by the ability to independently adjust the pressure profiles for the pads 112, 116, and 120 is the improved ability to balance the roll of the slider. In accordance with the embodiments of the present invention, the slider designer can more effectively tailor the pressure profiles at the front and back corners of the slider so that the slider flies substantially flat, thereby reducing the slider's roll.

According to an even further embodiment of the present invention, the outer border region 126 may serve as a "pre-ramp" to provide initial pressurization of air flow incident on the slider 100. The outer border region 126 is etched to be approximately 15 microns wide and approximately 1–4 microns deep, and is formed by the additive etches of the shallow step ramps 110, 114, and 118 and the deep cavity 136. The outside edges of the outer border region 126 are blended during the process of etching the step ramps 110, 114, and 118 and the cavity 136. This improves the reliability of the slider 100 because the blending process removes sharp corners that might otherwise chip during normal operation of the slider 100. The inventors have discovered that, for a particular slider according to the embodiments of the present invention, if the outer border region 126 preceding the leading edge ramp 110 is removed, the slider's change in pitch across the inner diameter of the disk to the outer diameter of the disk can decrease from 5 microns to 1 micron. This result leads the inventors to believe that the outer border region 126 does indeed serve as a pre-ramp to help converge incident air flow to the slider air bearing pads 100.

Figure 4:
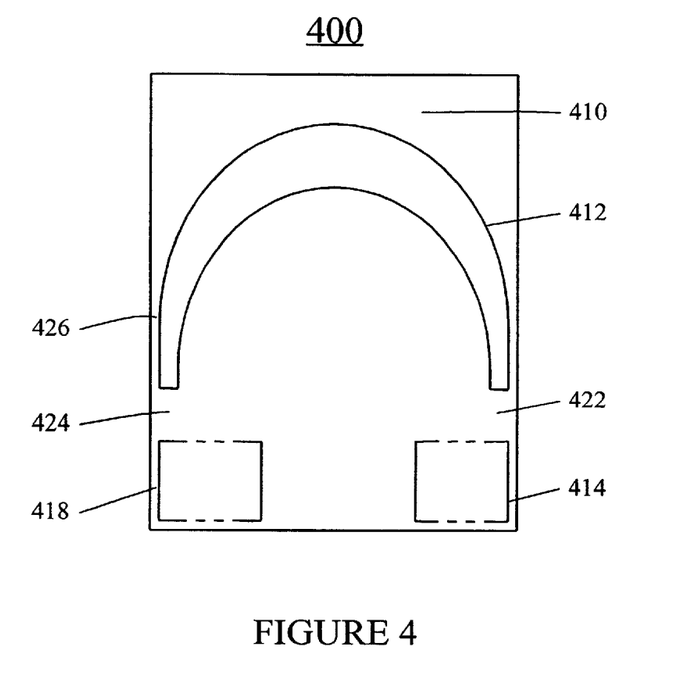
FIG. 4 shows a bottom plan view of another embodiment of an air bearing slider according to the present invention when operationally oriented with respect to the disk surface.

The designer achieves the desired pressure profiles by selecting appropriate shapes for the leading and trailing edge ramps and their associated pads that optimize the effective areas of the ramps and their respective pads to provide the desired pressure profiles. FIGS. 4–7 show several exemplary sliders according to embodiments of the present invention. The sliders shown in FIGS. 4–7 show some of the different shapes that are possible for the leading edge pad of a slider according to the embodiments of the present invention. Referring to FIG. 4, the slider, generally designated 400, has a leading edge step ramp 410, a leading edge pad 412, an inner trailing edge ramp/pad combination, generally designated 414, and an outer trailing edge ramp/pad combination, generally designated 414. The inner and outer trailing edge ramp/pad combinations will be described in more detail with respect to FIGS. 8A–8D and 9A–9D. The leading edge pad 412 and the inner trailing edge ramp/pad combination 414 define an inner air bleed slot 422. Likewise, the leading edge pad 412 and the outer trailing edge ramp/pad combination 418 define an outer air bleed slot 424. The slider 400 also includes an outer border region 426 around its perimeter.

Figure 5:
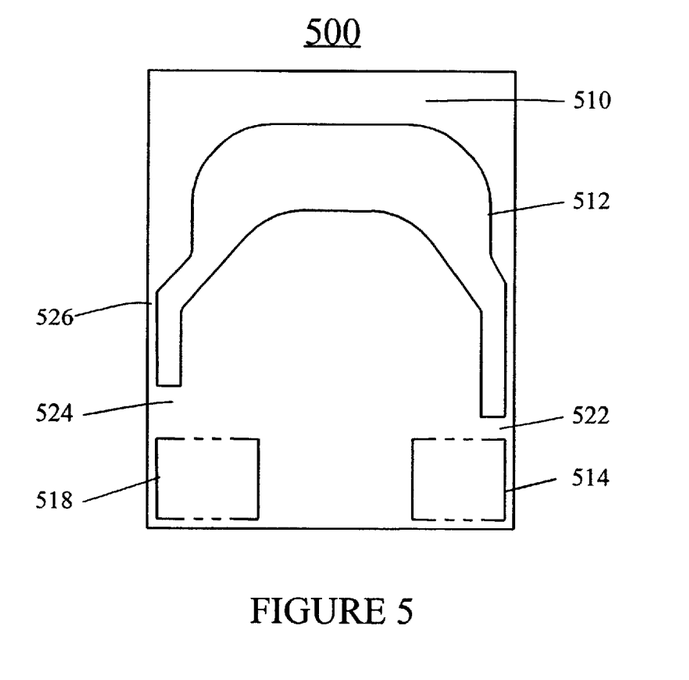
FIG. 5 shows a bottom plan view of yet another embodiment of an air bearing slider according to the present invention when operationally oriented with respect to the disk surface.

FIG. 5 shows an air bearing slider, generally designated 500, which includes a leading edge ramp 510, a leading edge pad 512, an inner trailing edge ramp/pad combination 514, and an outer trailing edge ramp/pad combination 518. The leading edge pad 512 and the inner trailing edge ramp/pad combination 514 define an inner air bleed slot 522. Likewise, the leading edge pad 512 and the outer trailing edge ramp/pad combination 518 define an outer air bleed slot 524. The slider 500 also includes an outer border region 526 around its perimeter.

Figure 6:
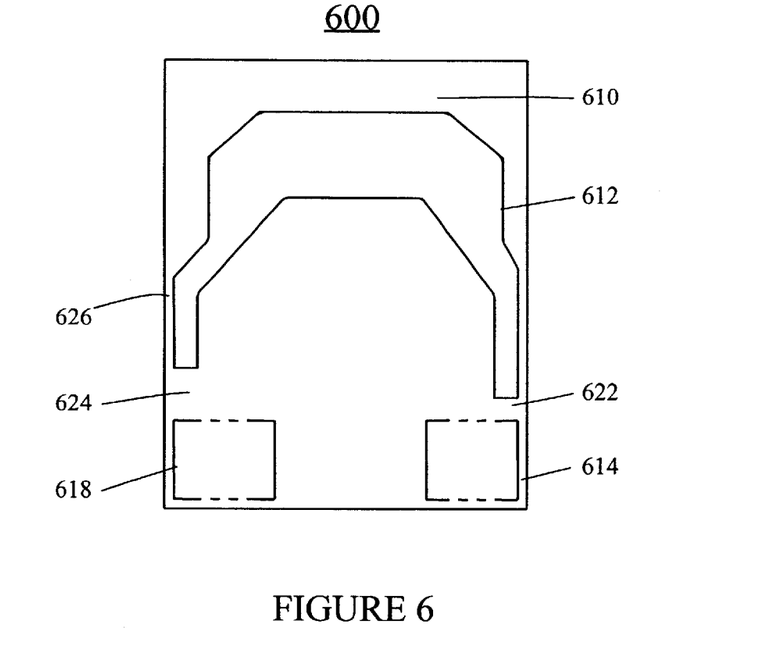
FIG. 6 shows a bottom plan view of a further embodiment of an air bearing slider according to the present invention when operationally oriented with respect to the disk surface.

FIG. 6 shows an air bearing slider, generally designated 600, which includes a leading edge ramp 610, a leading edge pad 612, an inner trailing edge ramp/pad combination 614, and an outer trailing edge ramp/pad combination 618. The leading edge pad 612 and the inner trailing edge ramp/pad combination 614 define an inner air bleed slot 622. Likewise, the leading edge pad 612 and the outer trailing edge ramp/pad combination 618 define an outer air bleed slot 624. The slider 500 also includes an outer border region 626 around its perimeter.

Figure 7:
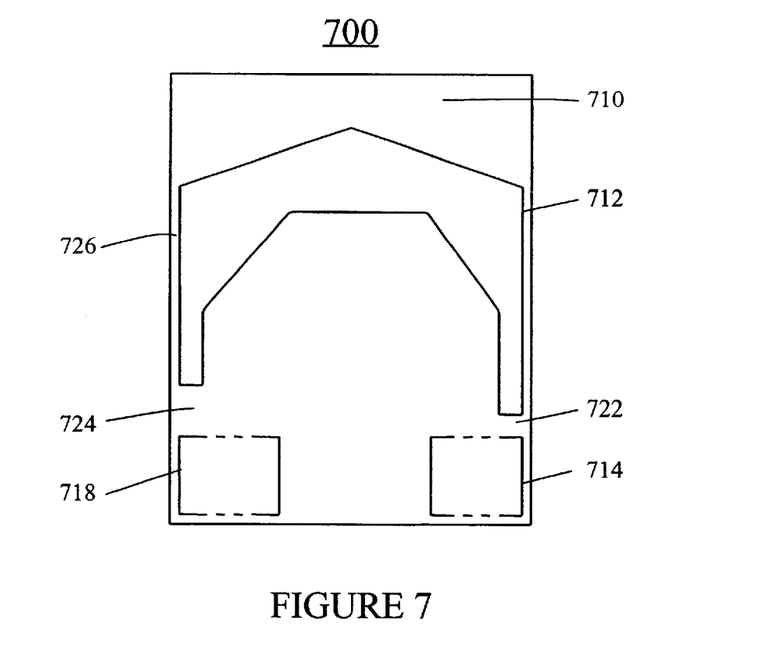
FIG. 7 shows a bottom plan view of an even further embodiment of an air bearing slider according to the present invention when operationally oriented with respect to the disk surface.
Figure 8A:
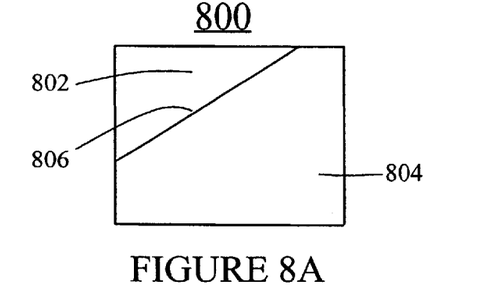
FIGS. 8A–8D show bottom plan views of representative embodiments of outer trailing edge ramps and pads for the air bearing sliders shown in FIGS. 4–7 when operationally oriented with respect to the disk surface.
Figure 8B:
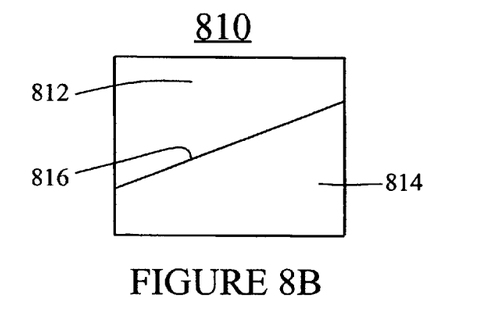
Figure 8C:
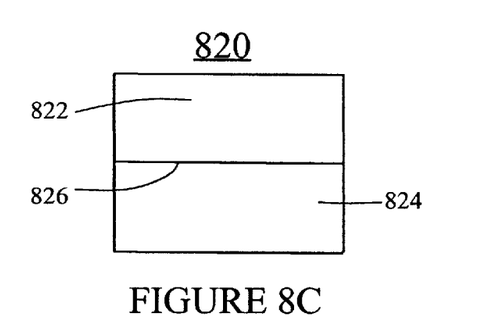
Figure 8D:
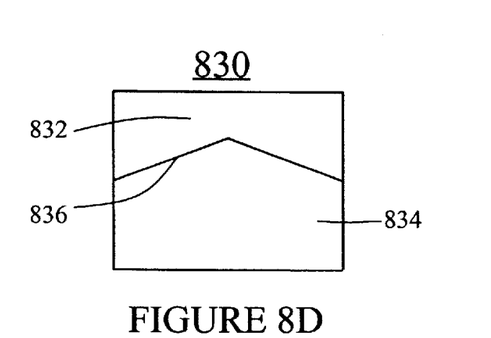
Figure 9A:
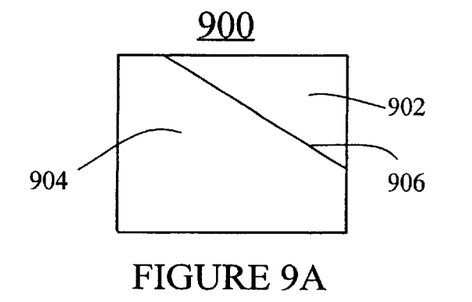
FIGS. 9A–9D show bottom plan views of representative embodiments of inner trailing edge ramps and pads for the air bearing sliders shown in FIGS. 4–7 when operationally oriented with respect to the disk surface.
Figure 9B:
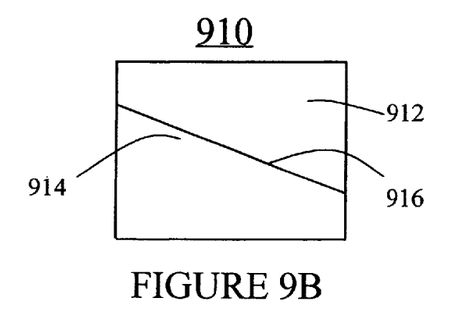
Figure 9C:
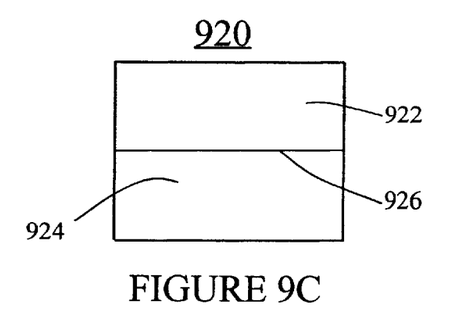
Figure 9D:
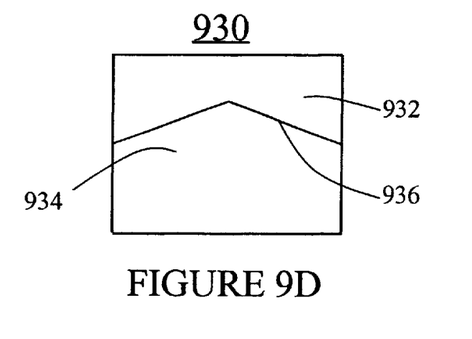

FIG. 7 shows an air bearing slider, generally designated 700, which includes a leading edge ramp 710, a leading edge pad 712, an inner trailing edge ramp/pad combination 714, and an outer trailing edge ramp/pad combination 718. The leading edge pad 712 and the inner trailing edge ramp/pad combination 714 define an inner air bleed slot 722. Likewise, the leading edge pad 712 and the outer trailing edge ramp/pad combination 718 define an outer air bleed slot 724. The slider 700 also includes an outer border region 726 around its perimeter.

The embodiments of the sliders shown in FIGS. 1 and 4–7 all use leading edge pads that have a generally horseshoe shape. According to an embodiment of the present invention, this generally horseshoe shape enables continuous optimization of the pressure underneath the leading edge pad of the slider for the entire range of skew angles from the inner diameter to the outer diameter of the magnetic media disk. Those having skill in the art will appreciate that, since the skew angle of the slider 100 changes as the slider 100 moves from the inner diameter of the disk to the outer diameter of the disk, the shapes of the leading edge pad 112 and its contour 128 must also be chosen to meet the fly height requirements at all skew angles and disk linear velocities between the inner and outer diameters of the disk, and not only at the inner and outer diameters of the disk. According to the embodiments of the present invention, the shapes of the leading edge pad 112 and its contour 128 are designed to provide optimized effective lengths for the ramp 110 and the respective pad 112 across the entire sweep of skew angles of the slider 100, from the inner diameter to the outer diameter of the disk, to balance the effects of variations in the linear velocity of the disk and the effective lengths of the ramp 110 and pad 112 to maintain constant fly height for the slider 100. Thus, the slider designer can tailor the shape of the leading edge pad to ensure that the effective length of the leading edge pad and its preceding ramp presented to the air flow incident to the leading edge pad at each skew angle of the slider results in the desired pressure underneath the leading edge pad as the slider moves from the inner diameter to the outer diameter of the magnetic media disk.

FIGS. 8A–8D show several exemplary embodiments of outer trailing edge ramp/pad combinations for air bearing sliders according to embodiments of the present invention. In the ramp/pad combination 800 shown in FIG. 8A, the shapes of the ramp 802 and the pad 804 and the orientation of the leading edge 806 of the pad 804 are chosen such that an air flow vector representing the air flow incident on the ramp 802 is substantially orthogonal to the leading edge 806 when the slider is at a maximum negative skew angle at the inner diameter of the disk. In the ramp/pad combination 810 shown in FIG. 8B, the shapes of the ramp 812 and the pad 814 and the orientation of the leading edge 816 of the pad 814 are chosen such that an air flow vector representing the air flow incident on the ramp 812 is substantially orthogonal to the leading edge 816 when the slider is at a negative skew angle that is between zero and the maximum negative skew angle. In the ramp/pad combination 820 shown in FIG. 8C, the shapes of the ramp 822 and the pad 824 and the orientation of the leading edge 826 of the pad 824 are chosen such that an air flow vector representing the air flow incident on the ramp 822 is substantially orthogonal to the leading edge 826 when the slider is at zero skew angle. In the ramp/pad combination 830 shown in FIG. 8D, the shapes of the ramp 832 and the pad 834 and the orientation of the leading edge 836 of the pad 834 are chosen such that an air flow vector representing the air flow incident on the ramp 832 is substantially orthogonal to the leading edge 836 when the slider is at either a negative skew angle at the inner diameter of the disk or a positive skew angle at the outer diameter of the disk.

FIGS. 9A–9D show several exemplary embodiments of inner trailing edge ramp/pad combinations for air bearing sliders according to embodiments of the present invention. In the ramp/pad combination 900 shown in FIG. 9A, the shapes of the ramp 902 and the pad 904 and the orientation of the leading edge 906 of the pad 904 are chosen such that an air flow vector representing the air flow incident on the ramp 902 is substantially orthogonal to the leading edge 906 when the slider is at a maximum positive skew angle at the outer diameter of the disk. In the ramp/pad combination 910 shown in FIG. 9B, the shapes of the ramp 912 and the pad 914 and the orientation of the leading edge 916 of the pad 914 are chosen such that an air flow vector representing the air flow incident on the ramp 912 is substantially orthogonal to the leading edge 916 when the slider is at a positive skew angle that is between zero and the maximum positive skew angle. In the ramp/pad combination 920 shown in FIG. 9C, the shapes of the ramp 922 and the pad 924 and the orientation of the leading edge 926 of the pad 924 are chosen such that an air flow vector representing the air flow incident on the ramp 922 is substantially orthogonal to the leading edge 926 when the slider is at zero skew angle. In the ramp/pad combination 930 shown in FIG. 9D, the shapes of the ramp 932 and the pad 934 and the orientation of the leading edge 936 of the pad 934 are chosen such that an air flow vector representing the air flow incident on the ramp 932 is substantially orthogonal to the leading edge 936 when the slider is at either a positive skew angle at the outer diameter of the disk or a negative skew angle at the inner diameter of the disk.

As shown in FIGS. 8A–8D and 9A–9D, the slider designer can tailor the shape of the outer and inner edge pads and their preceding ramps to ensure that the effective areas of the trailing edge pads and their preceding ramps presented to the air flow incident to the trailing edge pads at particular skew angles of the slider result in the desired pressure underneath the trailing edge pads to maintain fly height as the slider moves from the inner diameter to the outer diameter of the magnetic media disk. Thus, the slider designer can shape the trailing edge pads and their respective ramps to optimize the pressure underneath each of the trailing edge pads as a function of the slider's skew angle.

The air bearing sliders according to the embodiments of the present invention have many advantages, including improved take-off velocity, decreased change in pitch from the inner diameter of the disk to the outer diameter of the disk, and pressure profiles for the pads of the slider that not coupled to one another. In preferred embodiments of the present invention, the ratio of the shallow etch depth of the leading and trailing edge ramps to the deep etch depth of the negative pressure cavity 136 can be advantageously varied to improve the take-off velocity of the slider. A slider designer can vary this ratio to effect a desired balance between the take-off velocity and the altitude sensitivity of the slider.

Figure 10A:
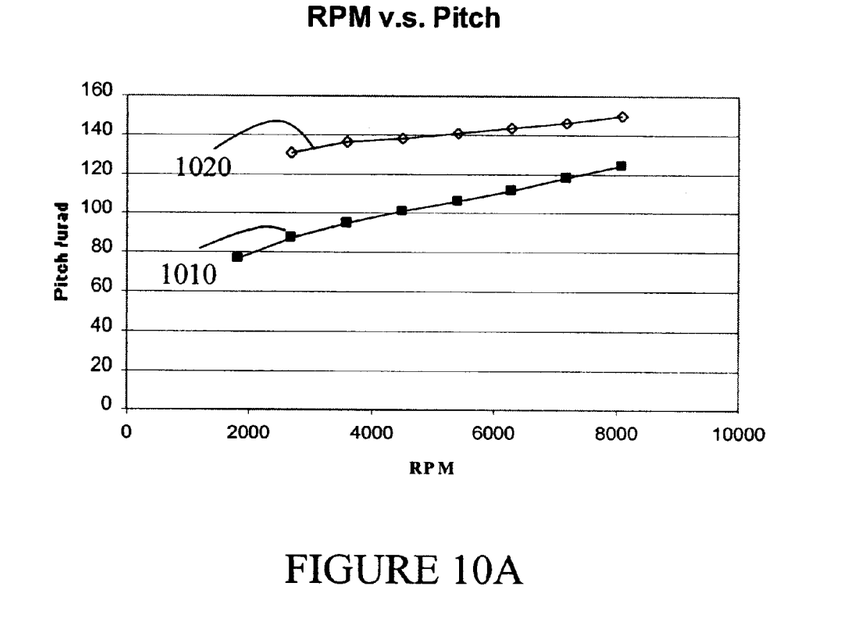
FIGS. 10A–10D are useful in explaining advantages associated with air bearing slider shown in FIG. 1.

In further preferred embodiments according to the present invention, air bleed slots enable a larger positive pressure to develop underneath the trailing edge pads than would be the case if the air bleed slots were not present. The presence of the air bleed slots advantageously allows the trailing edge of the slider to separate from the magnetic media disk more quickly than is possible with prior art slider designs, thereby causing the slider to be substantially flat as it lifts off from the landing zone of the magnetic media disk and reducing the pitch of the slider as it flies over the magnetic media disk. Referring to FIG. 10A, curve 1010 represents the pitch of the slider 100 shown in FIG. 1, and curve 1020 represents the pitch of the prior art rail-type slider shown in FIG. 11, as a function of the magnetic media disk's rotational velocity. As shown in FIG. 10A, the pitch of the slider 100 is considerably reduced in the landing zone over the rail-type slider shown in FIG. 11.

In even further preferred embodiments according to the present invention, the shapes of the pads and their respective ramps are designed to provide the largest effective areas for the ramps and the pads at the maximum negative skew angle of the slider at the landing zone of the disk to overcome the negative pressure generated at the cavity defined by the leading edge pad, thereby improving the take-off velocity of the slider by achieving a large net positive pressure at a low rotational velocity of the disk. In general, according to the embodiments of the present invention, the slider designer can advantageously tailor desired pressure profiles for the leading and trailing edge pads of the slider that are independent of one another as the slider sweeps from the inner diameter to the outer diameter of the disk. The designer can achieve the desired pressure profiles by selecting shapes for the leading and trailing edges pads and their respective ramps that optimize the effective areas of the pads and their respective ramps to provide the desired pressure profiles for the pads of the slider.

Figure 10B:
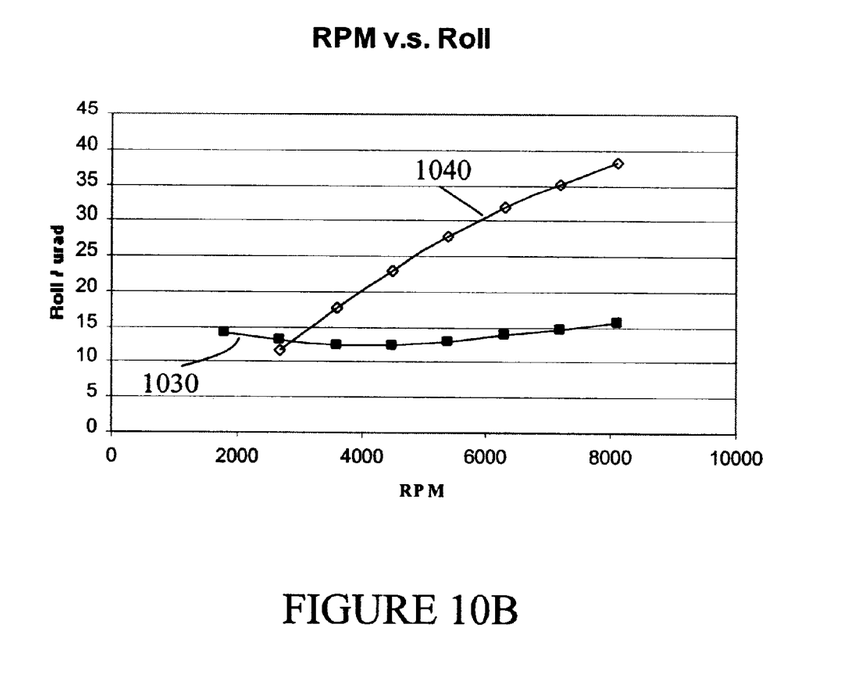

The ability to independently tailor desired pressure profiles for the leading and trailing edge pads of the slider 100 enables the slider 100 to achieve better performance relating to roll, take-off velocity, and fly height performance. Referring to FIG. 10B, curve 1030 represents the roll of the slider 100, and curve 1040 represents the roll of the rail-type slider shown in FIG. 11, as a function of the magnetic media disk's rotational velocity for a negative skew angle of 11°. As shown in FIG. 10B, the roll of the slider 100 remains substantially flat over the range of rotational velocities of the magnetic disk media.

Figure 10C:
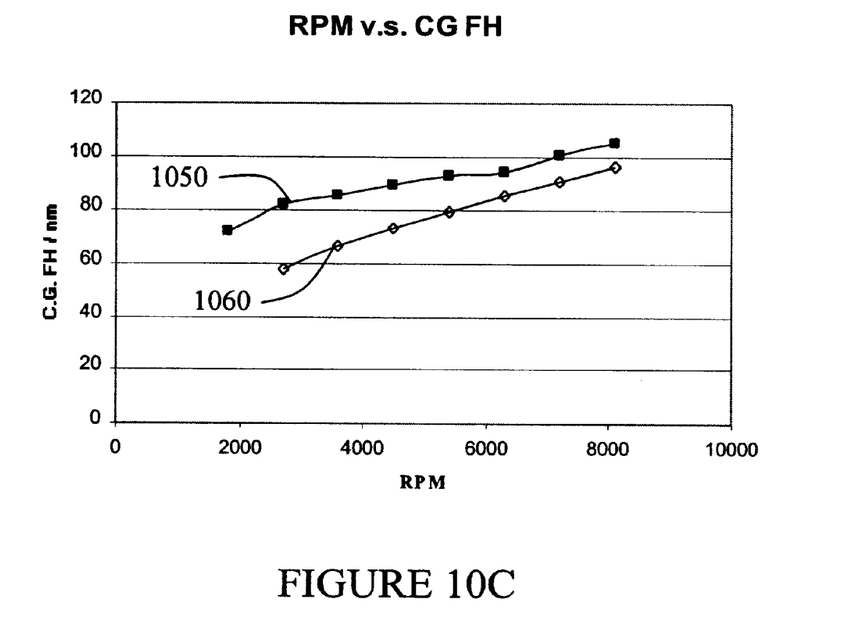

Referring to FIG. 10C, curve 1050 represents the fly height of the center of gravity of the slider 100, and curve 1060 represents the fly height of the center of gravity of the slider shown in FIG. 11, as a function of the magnetic media disk's rotational velocity. As shown in FIG. 10C, the increased fly height of the slider 100 over the prior art slider of FIG. 11 at lower rotational velocities indicates the increased take-off velocity of the slider 100.

Figure 10D:
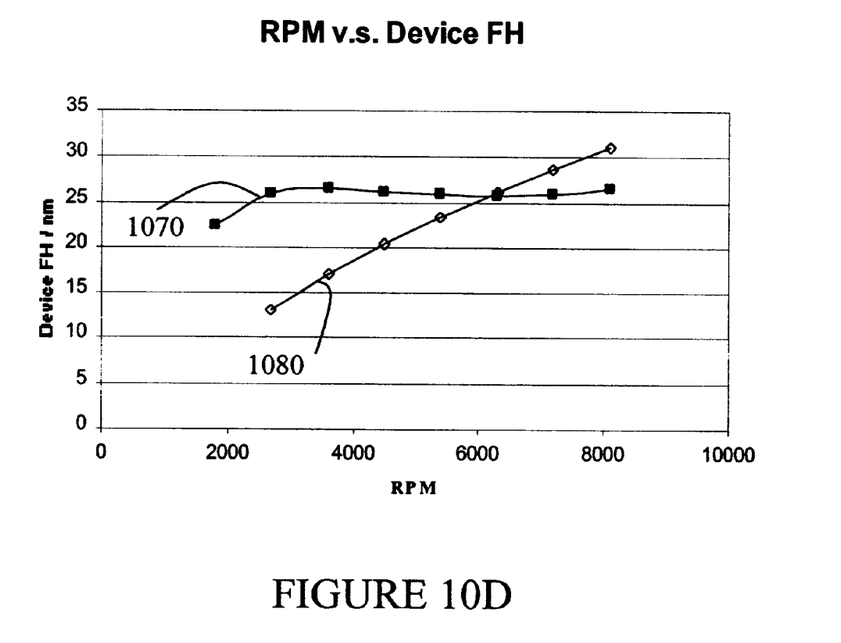

Referring to FIG. 10D, curve 1070 represents the fly height of the transducer that is supported by the slider 100, and curve 1080 represents the fly height of the transducer supported by the slider shown in FIG. 11, as a function of the rotational velocity of the magnetic media disk. As shown in FIG. 10D, the increased fly height of the slider 100 over the prior art slider of FIG. 11 at lower rotational velocities indicates the increased take-off velocity of the slider 100. Furthermore, the fly height of the transducer of the slider 100 remains substantially flat over the range of rotational velocities of the magnetic media disk. In fact, a close examination of curve 1070 reveals that the fly height of the transducer of the slider 100 is lower at the disk's operating rotational velocity (in the case of FIGS. 10A–10D, 7200 rpm) than at lower rotational velocities.

Finally, the improved take-off velocity of the slider 100 reduces the wear of the interface between the slider by reducing the time (or the number of rotations) during which the slider is in contact with the magnetic media disk.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An air bearing slider for supporting a transducer over a moving recording medium based on air flow generated thereby, said air bearing slider comprising:

a first pad formed near a leading edge of said slider and having a first leading edge contoured to provide a first effective length relative to said air flow for said first pad;

a second pad formed near a trailing edge of said slider and having a second leading edge contoured to provide a second effective length relative to said air flow for said second pad; and a third pad formed near said trailing edge of said slider and having a third leading edge which is contoured to provide a third effective length relative to said air flow for said third pad;

wherein said first, second, and third effective lengths vary as the air bearing slider moves relative to the moving recording medium to maintain a desired orientation and fly height for said slider during such movement.

2. The air bearing slider of claim 1, further comprising a first ramp surface contiguous with said first leading edge of said first pad.

3. The air bearing slider of claim 2, wherein said first pad is generally U-shaped and defines a negative pressure region.

4. The air bearing slider of claim 3, further comprising a second ramp surface contiguous with said second leading edge of said second pad.

5. The air bearing slider of claim 4, further comprising a third ramp surface contiguous with said third leading edge of said third pad.

6. The air bearing slider of claim 5, wherein said first, second, and third ramp surfaces comprise step-type ramp surfaces.

7. The air bearing slider of claim 6, wherein said step-type ramp surfaces are formed at a first etch depth.

8. The air bearing slider of claim 7, wherein said negative pressure region is formed at a second etch depth that is greater than said first etch depth.

9. The air bearing slider of claim 8, wherein said first and second pads and said first and third pads are spaced apart to form air bleed slots therebetween.

10. A disk drive apparatus for recording data, said disk drive apparatus comprising:

at least one rotating disk for recording said data thereon;

a housing, the rotatable disk being rotatably attached to said housing;

an actuator arm assembly coupled to said housing; and a slider attached to the actuator arm assembly proximate to a recording surface of said rotating disk such that the slider can be selectively positioned over the surface of said rotating disk, said slider further comprising:

a first pad formed near a leading edge of said slider and having a first leading edge contoured to provide a first effective length relative to said air flow for said first pad;

a second pad formed near a trailing edge of said slider and having a second leading edge which is contoured to provide a second effective length relative to said air flow for said second pad; and a third pad formed near said trailing edge of said slider and having a third leading edge which is contoured to provide a third effective length relative to said air flow for said third pad;

wherein said first, second, and third effective lengths vary as the air bearing slider moves relative to the moving recording medium to maintain a desired orientation and fly height for said slider during such movement.

11. The disk drive apparatus of claim 10, wherein said slider further comprises a first ramp surface contiguous with said first leading edge of said first pad.

12. The disk drive apparatus of claim 11, wherein said first pad of said slider is generally U-shaped and defines a negative pressure region.

13. The disk drive apparatus of claim 12, wherein said slider further comprises a second ramp surface contiguous with said second leading edge of said second pad.

14. The disk drive apparatus of claim 13, wherein said slider further comprises a third ramp surface contiguous with such third leading edge of said third pad.

15. The disk drive apparatus of claim 14 wherein said first, second, and third ramp surfaces of said slider comprise step-type ramp surfaces .

16. The disk drive apparatus of claim 15, wherein said step-type ramp surfaces of said slider are formed at a first etch depth.

17. The disk drive apparatus of claim 16, wherein said negative pressure region of said slider is formed at a second etch depth that is greater than said first etch depth.

18. The disk drive apparatus of claim 17, wherein said first and second pads and said first and third pads of said slider are spaced apart to form air bleed slots therebetween.

* * * * *